US012811477B2

(12) United States Patent
Bier et al.

(10) Patent No.: US 12,811,477 B2
(45) Date of Patent: Nov. 24, 2026

(54) METHOD FOR IMPREGNATING AT LEAST ONE WIRE WINDING OF A COMPONENT

(71) Applicant: AUDI AG, Ingolstadt (DE)

(72) Inventors: Alexander Bier, Gaimersheim (DE); Martin Gerngroß, Kinding (DE); Peer Stenzel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 57 days.

(21) Appl. No.: 19/116,592

(22) PCT Filed: Sep. 26, 2023

(86) PCT No.: PCT/EP2023/076543

§ 371 (c)(1),
(2) Date: Mar. 28, 2025

(87) PCT Pub. No.: WO2024/088677

PCT Pub. Date: May 2, 2024

(65) Prior Publication Data

US 2026/0151940 A1 Jun. 4, 2026

(30) Foreign Application Priority Data

Oct. 27, 2022 (DE) ..................... 10 2022 128 506.5

(51) Int. Cl.
*H02K 15/12* (2025.01)
*B29C 39/10* (2006.01)
(Continued)

(52) U.S. Cl.
CPC ............. *H02K 15/12* (2013.01); *B29C 39/10* (2013.01); *B29C 39/38* (2013.01); *B29C 39/42* (2013.01);
(Continued)

(58) Field of Classification Search
CPC ......... B29C 39/10; B29C 39/38; B29C 39/42; B29C 39/44; H02K 15/12; H01F 41/127; B29K 2063/00; B29K 2067/00
See application file for complete search history.

(56) References Cited

U.S. PATENT DOCUMENTS

2022/0094248 A1 3/2022 Kobayashi et al.
2023/0170774 A1* 6/2023 Blanc .................... H02K 15/12 310/216.001

FOREIGN PATENT DOCUMENTS

AT 402243 B 3/1997
DE 1538918 A1 11/1970
(Continued)

OTHER PUBLICATIONS

International Preliminary Report on Patentability issued on Jan. 28, 2025, in corresponding International Application No. PCT/EP2023/076543, 36 pages.
(Continued)

*Primary Examiner* — Jerzi H Moreno Hernandez
(74) *Attorney, Agent, or Firm* — Maier & Maier, PLLC

(57) ABSTRACT

A method for impregnating at least one wire winding of a component. The at least one wire winding has a winding head on at least one end side of opposing end sides of the component and runs in an intermediate region between the end sides along an extension direction of the component. The method includes: heating the component; aligning the component so the extension direction runs vertically and the winding head is on the vertically upper end side; applying an impregnating material, to at least one first component region of the component on the vertically upper end side to coat the winding head with the impregnating material so the impregnating material flows from the winding head, via the intermediate region, in the direction of the vertically lower end
(Continued)

side according to the force of gravity and/or capillary action; and solidifying the impregnating material.

20 Claims, 12 Drawing Sheets

(51) Int. Cl.

| | |
|---|---|
| ***B29C 39/38*** | (2006.01) |
| ***B29C 39/42*** | (2006.01) |
| ***B29C 39/44*** | (2006.01) |
| ***H01F 41/12*** | (2006.01) |
| *B29K 63/00* | (2006.01) |
| *B29K 67/00* | (2006.01) |
| *B29L 31/00* | (2006.01) |

(52) U.S. Cl.
CPC ........... *B29C 39/44* (2013.01); *H01F 41/127* (2013.01); *B29K 2063/00* (2013.01); *B29K 2067/00* (2013.01); *B29L 2031/7498* (2013.01)

(56) References Cited

FOREIGN PATENT DOCUMENTS

| | | | |
|---|---|---|---|
| DE | 19822433 | A1 | 12/1999 |
| DE | 102019218603 | A1 | 6/2021 |
| DE | 102020123852 | A1 | 3/2022 |
| DE | 102021001874 | B3 | 6/2022 |
| EP | 2113991 | B1 | 7/2015 |
| EP | 2710708 | B1 | 8/2015 |
| EP | 4068596 | A1 | 10/2022 |
| JP | S5713951 | A | 1/1982 |
| JP | 3618956 | B2 | 2/2005 |
| JP | 4900279 | B2 | 3/2012 |
| JP | 6255734 | B2 | 1/2018 |
| WO | 2020162088 | A1 | 8/2020 |
| WO | 2022018336 | A1 | 1/2022 |
| WO | 2022128632 | A1 | 6/2022 |

OTHER PUBLICATIONS

Search Report and Written Opinion issued on Dec. 12, 2023, in corresponding International Application No. PCT/EP2023/076543, 37 pages.

Examination Report issued on Dec. 7, 2023, in corresponding German Application No. 10 2022 128 506.5, 14 pages.

Kamper et al., “Production of a Hairpin Stator”, PEM of RWTH Aachen University and VDMA Eigendruck, ISBN: 978-3947920-08-2, Oct. 2019, 1st Edition, 8 pages.

* cited by examiner

METHOD FOR IMPREGNATING AT LEAST ONE WIRE WINDING OF A COMPONENT

FIELD

The invention relates to a method for impregnating at least one wire winding of a component. The method further relates to a component and an electric motor.

BACKGROUND

Windings in stators or rotors of electrical machines are usually impregnated. This primarily serves to mechanically fix the windings, but also fulfills other tasks, such as increasing the electrical insulation capacity of the windings, improving heat dissipation (dissipation of the power loss of the windings) or improving protection against environmental influences (air humidity, oil, etc.). These secondary tasks are particularly important for automotive traction drives in order to ultimately reduce the costs of the drives. Of the multitude of known methods, the trickle coating process, the hot dipping process and the roll dipping process are particularly used in automotive traction drives. Other methods include the vacuum (VI) process, the vacuum pressure (VPI) process and the atmospheric dipping process (dip & bake). The common methods each have specific advantages and disadvantages.

SUMMARY

The object of the invention is to provide an alternative or improved impregnation method.

To achieve this object, the invention provides a method for impregnating at least one wire winding of a component.

According to one aspect, the invention provides a method for impregnating at least one wire winding of a component, in particular a stator or a rotor for an electric motor, wherein the at least one wire winding has (at least) one winding head on at least one end side of opposing end sides of the component and runs in an intermediate region between the end sides along an extension direction of the component, the method comprising the following steps:

a) heating, preferably homogeneously heating, the component;

b) aligning the component in such a way that the extension direction is substantially vertical or perpendicular and the (at least one) winding head is arranged on the vertically upper end side;

c) applying a liquid and/or solidifiable impregnating material which melts with the application of heat, to at least one first component region of the component on the vertically upper end side to introduce the impregnating material into at least one region of the winding head in such a way that the impregnating material flows due to gravity and/or capillary action from the winding head via the intermediate region (i.e. along the groove) in the direction of the vertically lower end side; and d) solidifying the impregnating material.

An advantage of the method according to the invention can be that external regions of the component are not coated with impregnating material. With the method according to the invention, the impregnation can be limited to the wire winding. Other regions that are not to be covered with impregnating material can be kept free.

If, for example, the component is a rotor, the outer regions of a laminated core of the rotor can be kept free of impregnating material. If the rotor has additional cooling channels for cooling the rotor, the cooling channels can be kept free of impregnating material.

This eliminates the need for complex post-processing of the component to remove impregnating material. The impregnation process is thus significantly simplified.

Furthermore, the impregnating material is only introduced from the vertically upper end side of the component and thus only from one direction. A flow direction of the impregnating material is arranged parallel to the extension direction of the wires of the wire winding of the component, i.e. vertically downwards and thus at least partially gravity-driven. The air in the wire winding can escape to the vertically lower end side. This can reduce the occurrence of air inclusions.

It is preferred that step d) comprises one, several or all of the following steps:

d1) gelling the impregnating material on the at least one wire winding;

d2) gelling the impregnating material by heat treatment of the component, preferably by means of energizing the at least one wire winding, by infrared radiation, convection air and/or induction;

d3) gelling the impregnating material to prevent the flow of the impregnating material; and d4) gelling the impregnating material in at least one lower winding region of the at least one wire winding and thereby creating a backflow of impregnating material in a winding region arranged above it; and d5) successive gelling of the impregnating material in a plurality of winding regions.

An advantage of the invention can be that, for example, gelling of the impregnating material in the wire winding can take place at the same time as the impregnating material is applied to the first component region. Thus, the wire winding can be successively coated or filled with impregnating material and/or a backflow of liquid impregnating material can be caused in the wire winding by means of a gelled part of the impregnating material, whereby an amount of impregnating material held in the wire winding can be increased. In addition, the wire winding can be coated with a larger amount of impregnating material than would be possible if the heating had to take place over the entire component at the same time. The filling level of impregnating material in the wire winding is increased.

Gelling can be initiated by heat treatment of the component. Gelling can also initially be initiated in a limited manner to a winding region of the wire winding. The gelling of the impregnating material therefore does not have to be initiated simultaneously on the entire wire winding, but can be initiated locally and limited to the winding region.

For example, a first winding region may be located in a lower region of the component. In this way, the impregnating material can first be gelled in the first winding region and then the wire winding can be further coated and/or filled with impregnating material in the direction of the vertically upper end side.

Gelling can then be initiated in a second winding region, which is arranged, for example, vertically above the first winding region.

It is preferred that step d) comprises one or both of the following steps:

d6) curing the impregnating material on the at least one wire winding; and d7) curing the impregnating material by heat treatment of the component.

Curing is preferably carried out by heat treating the component. The heat treatment can be done externally. For example, the component can be warmed or heated in an oven. The component is kept at a temperature that is required for solidification and/or curing according to the specification of the impregnating material.

It is preferred that one, several or all steps of the method are carried out under energization of the at least one wire winding and/or under vacuum.

The liquefaction of the impregnating material can occur through the heated component. Preferably, the liquefaction is supported by energizing the wire winding. By energizing the wire winding, the preheated component can also be kept warm. If the impregnating material is applied under vacuum, the occurrence of air inclusions after curing can be further reduced.

In addition or as an alternative to the external heat treatment of the component, gelling can also be carried out by energizing the at least one wire winding, i.e. by internal heating.

In addition or as an alternative to the heat treatment of the component, the curing can be carried out by energizing the at least one wire winding.

If gelling takes place under vacuum, the occurrence of air inclusions after curing can be further reduced.

It is preferred that step c) comprises one or both of the following steps:

c1) applying an impregnating material, the viscosity of which is reduced by heating the impregnating material; and c2) applying an impregnating resin, preferably an epoxy resin and/or a polyester resin.

An advantage of the method may be that an impregnating material can be used which, for example, has a high viscosity at room temperature, but whose viscosity decreases when heated. This means that the impregnating material can be applied to the winding head in a more targeted manner, for example in a viscous or even solid form. Other regions can be kept free of impregnating material. The component heated in step a) causes the impregnating material to become thinner, so that the impregnating material is distributed exactly in the desired region. This avoids coating the component with impregnating material in undesirable regions, which eliminates the need for time-consuming post-processing.

It is preferred that, in order to apply the impregnating material, an overpressure is generated on the vertically upper end side of the component and/or a negative pressure is generated on the vertically lower end side of the component.

To improve the distribution of the impregnating material in the flow direction from vertical top to vertical bottom, an overpressure can be generated on the vertically upper end side of the component and/or a negative pressure on the vertically lower end side of the component. This can accelerate the distribution of the impregnating material and the impregnation method in general.

It is preferred that one, several or all of the following steps are performed prior to application:

f1) sealing and/or covering at least a second component region of the component which is not to be coated with impregnating material;

f2) sealing and/or covering a second component region on the vertically upper end side such that when impregnating material is applied to the at least one first component region, the impregnating material flows exclusively from the winding head over the at least one wire winding, in particular the intermediate region, in the direction of the vertically lower end side; and f3) forming a reservoir on the vertically upper end side for flooding the winding head with impregnating material.

It is preferred that the method comprises:

f4) flooding at least part of the winding head with impregnating material by filling the reservoir with impregnating material.

It is preferred that the method comprises:

f5) avoiding application of the impregnating material to the at least one second component region which is not to be coated with impregnating material.

An advantage of the invention may be that second component regions are not coated with impregnating material. These second component regions can be additionally sealed and/or covered before application. Other regions, such as external regions of the component, do not need to be sealed and/or covered because the impregnating material cannot reach them anyway. For example, by sealing and/or covering second component regions on the vertically upper front side, the impregnating material can be distributed in a targeted manner and the component can be protected from contamination by impregnating material. Sealing and/or covering can also prevent unwanted aerosols or splashes from the impregnating material from settling on the region to be kept clear during gelling and curing.

Another possibility of the invention is to design the vertically upper end side of the component in such a way that a reservoir is formed there for flooding the winding head with impregnating material. This requires only a slight further development of the vertical upper end side of the component.

It is preferred that step c) comprises one or both of the following steps:

c3) applying a metered amount of the impregnating material; and c4) flushing out air inclusions in the at least one wire winding by excess and/or continuous application of impregnating material.

In the method according to the invention, the application quantity of the impregnating material can be determined. Thus, the degree of impregnation of the wire winding can be determined and/or adjusted by preventing any excess from being introduced into the component in the first place. In addition, the method can be optimized with regard to consumption of impregnating material.

The application quantity required for a certain degree of impregnation can be determined empirically. The flushing out and/or displacement of air inclusions can also be optimized by empirically determined process parameters, for example an application speed, an application position and/or a temporal dependence of the application of the impregnating material. Alternatively or additionally, air inclusions can be flushed out and/or displaced by continuously applying the impregnating material, which increases the quality of the impregnation.

Preferably, a continuous flow of impregnating material is formed over and/or through the wire winding.

It is preferred that step c) comprises one, several or all of the following steps:

c5) detecting an application quantity of the impregnating material which is applied to the first component region and/or detecting a dripping quantity of the impregnating material which drips off the vertically lower end side of the component;

c6) determining a degree of impregnation of the at least one wire winding; and (c7) regulating and/or metering an application quantity of the impregnating material based on a degree of impregnation.

It is preferred that step c) comprises one or both of the following steps:

c8) determining the degree of impregnation by detecting an electrical capacitance of the at least one wire winding by means of a measuring circuit; and c9) determining the degree of impregnation by comparing the amount applied and the amount dripped off.

It is preferred that step c) further comprises:

c10) regulating and/or metering the amount of impregnating material applied so that it approximately corresponds to the dripping amount.

An advantage of the invention may be that the application quantity and the dripping quantity of the impregnating material can be detected. This allows the impregnation method to be further optimized and the quality of the impregnation to be continuously checked. By controlling the amount of impregnating material applied, the wire winding can be continuously coated with impregnating material without regions that need to be kept free being coated with impregnating material.

It is preferred that the method further comprises the steps:

g1) collecting impregnating material dripping down on the vertically lower end side; and g2) returning the collected impregnating material for reapplication to the winding head.

By collecting impregnating material and returning it, a recycling of impregnating material can be created through the wire winding. This reduces the consumption of impregnating material and saves costs.

According to a further aspect, the invention provides a component, in particular a stator or a rotor for an electric motor, with at least one wire winding which has a winding head on at least one end side of opposing end sides of the component and runs in an intermediate region between the end sides along an extension direction of the component, wherein the at least one wire winding has an impregnation which is produced and/or obtainable by the method according to any one of the preceding embodiments.

It is preferred that the at least one wire winding is free of air inclusions and/or homogeneously filled with impregnating material in the entire region between the end sides.

It is preferred that the component is designed as a rotor for an electric motor, wherein the rotor comprises a plurality of cooling channels for cooling the rotor, wherein the cooling channels run at least partially axially (parallel to the intended axis of rotation) through the rotor and emerge on the at least one end side having the winding head in a component region to which no impregnating material is applied in the method according to any one of the preceding embodiments, wherein the cooling channels are free of impregnating material.

By aligning the axial sections of the cooling channels vertically during the filling of the wire windings with the impregnating material and, parallel thereto, the wires of the wire winding, and by allowing the impregnating material to drip or run vertically downwards between the wires, drawn by gravity, pressure in the impregnating material across the cooling channels is avoided, which could drive the impregnating material through gaps into the cooling channels, thus keeping the cooling channels free of impregnating material.

Only a capillary effect or a dynamic pressure could drive the impregnating material through the gaps into the cooling channels. To counteract this too, a respective sealing ring or a respective sealing disk can be provided to close gaps extending radially with respect to the axis of rotation of the rotor, such as might otherwise be present between sheet iron of a laminated core of the rotor and/or between the laminated core and the star washer.

This also prevents the impregnating material from leaking out onto the lateral surface of the rotor. This keeps the outermost circumference of the rotor free of impregnating material, which saves rework and allows an air gap of an electrical machine to be manufactured precisely.

It is preferred that the component is designed as a rotor for an electric motor, wherein the at least one wire winding is wound around at least one tooth of the rotor and the rotor preferably has a winding head on each of the end sides.

It is preferred that the component has a plurality of wire windings and teeth, wherein the wire windings form a concentrated winding around the teeth.

According to a further aspect, the invention provides an electric motor with the component according to any one of the preceding embodiments.

The invention also comprises the combinations of the features of the described embodiments. The invention therefore also comprises implementations which each have a combination of the features of several of the described embodiments, unless the embodiments have been described as mutually exclusive.

BRIEF DESCRIPTION OF THE FIGURES

Exemplary embodiments of the invention are described hereinafter. In the figures.

DETAILED DESCRIPTION

Figure 1:
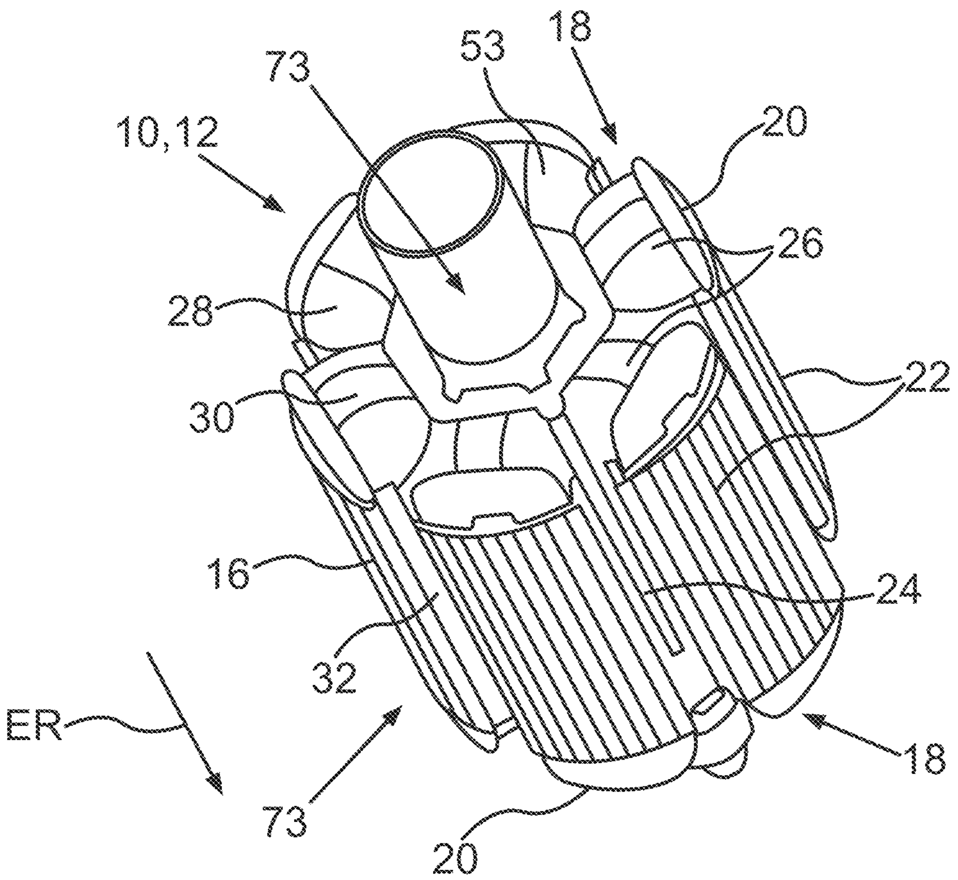
FIG. 1 shows a component which is designed as an example as a rotor for an electric motor.

The exemplary embodiments explained below are preferred embodiments of the invention. In the exemplary embodiments, the described components of the embodiments each represent individual features of the invention to be considered independently of one another, which each also develop the invention independently of one another. Therefore, the disclosure is also predetermined to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a component 10 which is designed as an example as a rotor 12 for an electric motor.

The rotor 12 has a laminated core 16 which is approximately cylindrical in outline and consists of a plurality of laminated sheets which are arranged in a row along an extension direction ER of the rotor 12. A star washer 20 is arranged on each of the opposing end sides 18 of the laminated core 16.

The laminated core 16 and the star washers 20 are designed such that the rotor 12 has at least one tooth 22. The rotor 12 shown in FIG. 1 has six teeth 22. A groove 24 is arranged between each two teeth 22.

The rotor 12 further has at least one wire winding 26. In the example of FIG. 1, the rotor 12 has six wire windings 26. The wire windings 26 consist of a continuous wire 28, for example a enameled wire with a round cross-section.

Each wire winding 26 is wound around a single tooth 22. On the end sides 18 of the rotor 12, the wire windings 26 each have a winding head 30 which extends over the respective tooth 22 from one groove 24 to the other groove 24. In intermediate regions 32 between the end sides 18, the wire windings 26 each run along the extension direction ER of the rotor 12 within the grooves 24. Such an arrangement of the wire windings 26 is also referred to as concentrated winding around the teeth 22.

Figure 2:
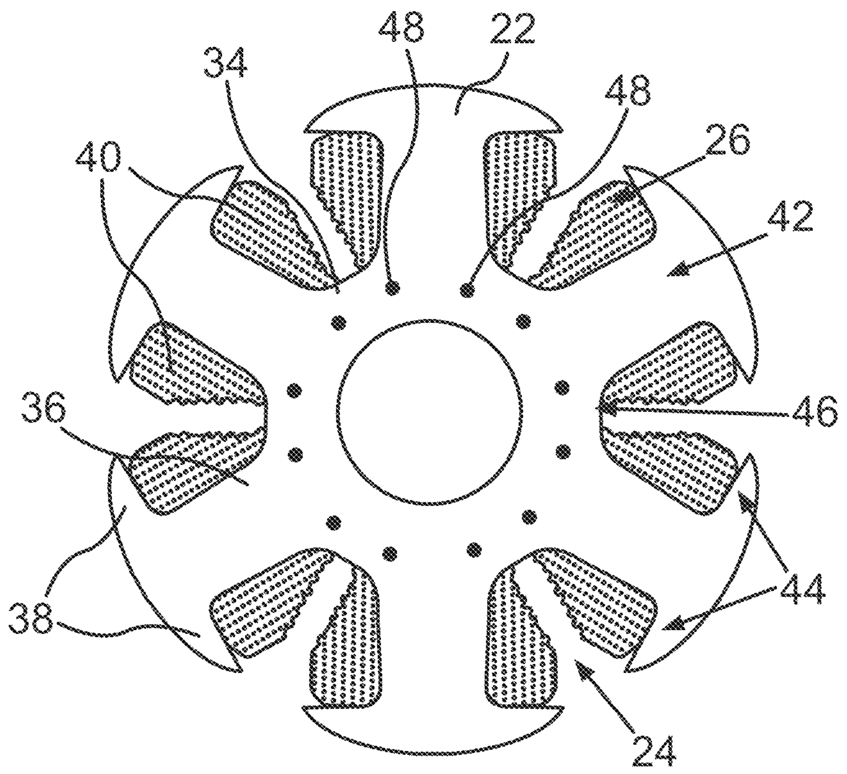
FIG. 2 shows a section of the rotor in a plan view.

FIG. 2 shows a section of the rotor 12 in a plan view.

The teeth 22 are connected to a radially inner rotor ring 34 of the rotor 12. The teeth 22 are each T-shaped with a T-web 36 and two T-legs 38. Each wire winding 26 is wound around a single T-web 36 and forms a coil 40. The wire windings 26 are also designed to be energized. When energized, a magnetic pole 42 is formed around each of the teeth 22. Therefore, the T-webs 36 in connection with the T-legs 38 are also called pole shoes 44 and the region of the rotor ring 34 in a groove 24 is also called yoke 46.

The rotor 12 further comprises a plurality of cooling channels 48 for cooling the rotor 12, which run through the laminated core 16 along the extension direction ER of the rotor 12. At least one cooling channel 48 is arranged on each of the teeth 22.

Figure 3:
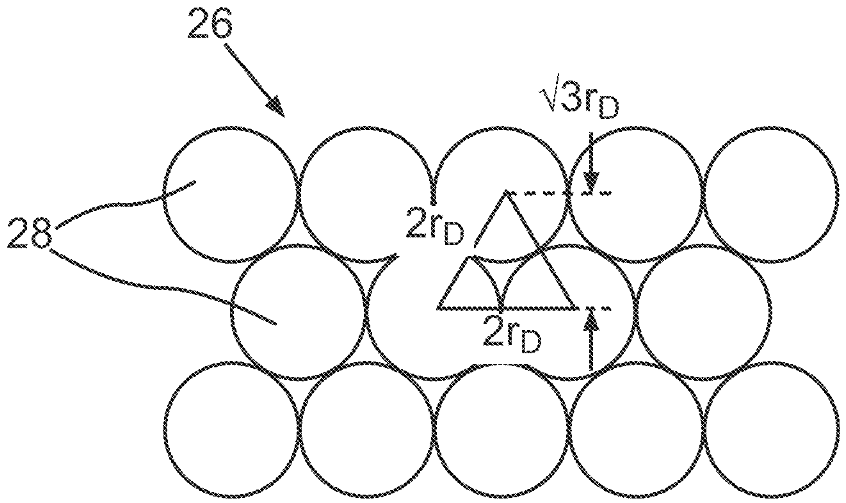
FIG. 3 shows an arrangement of a wire in a wire winding of the rotor.

FIG. 3 shows an arrangement of the wire 28 in one of the wire windings 26. The wire 28 in a wire winding 26 is arranged orthocyclically. The wire 28 is arranged in a plurality of layers, wherein the wire 28 is arranged in one layer offset from the wire 28 of the previous layer.

Figure 4:
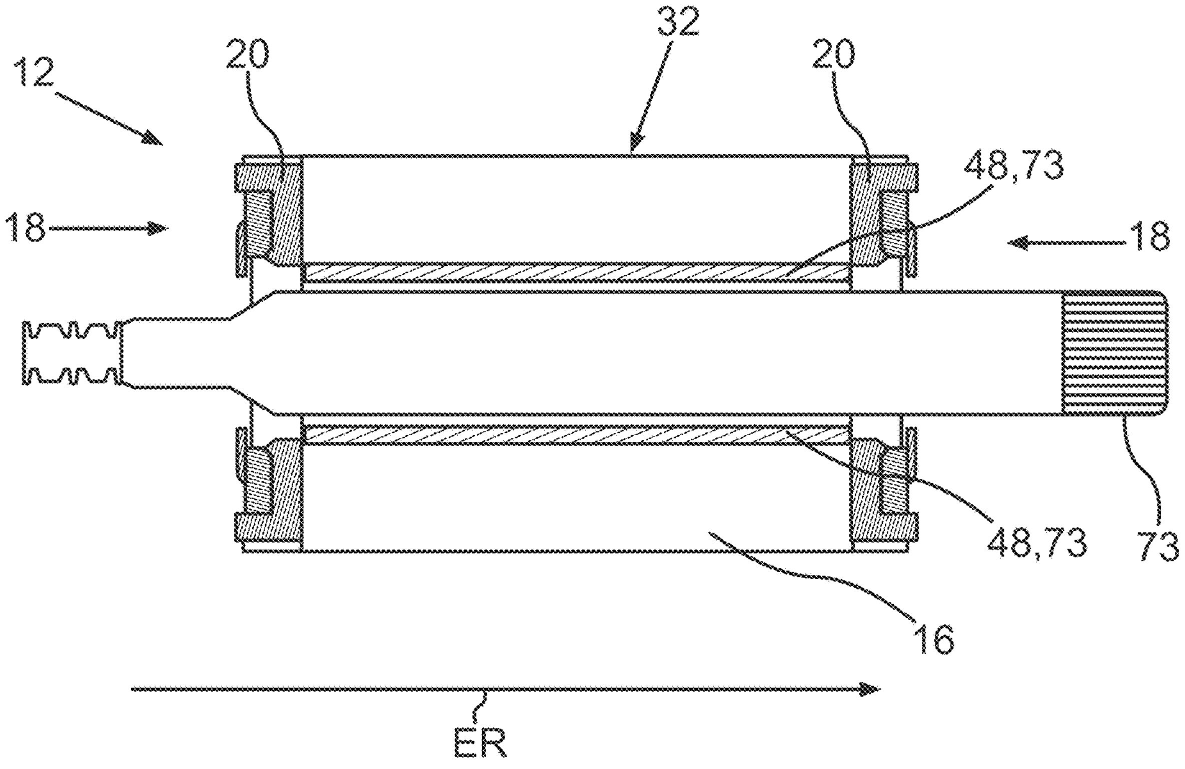
FIG. 4 shows a section of the rotor in a side view.

FIG. 4 shows a section of the rotor 12 in a side view.

The cooling channels 48 extend in the intermediate regions 32. The cooling channels 48 can also run through the star washers 20 and exit at the end sides 18.

Figure 5:
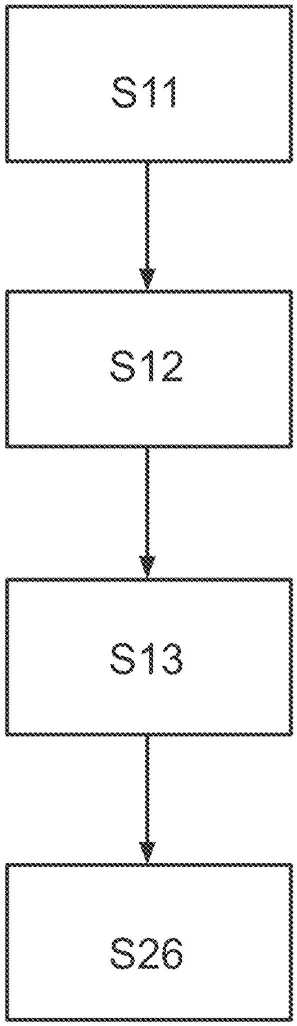
FIG. 5 shows an embodiment of a method for impregnating the wire windings of the rotor.

An embodiment of a method for impregnating the wire windings 26 of the rotor 12 is described below with reference to FIG. 5.

The method can be applied equally to a stator 50 for an electric motor and/or in general to any component 10 which has at least one wire winding 26 which has a winding head 30 on at least one end side 18 of opposing end sides 18 of the component 10 and runs in an intermediate region 32 between the end sides 18 along an extension direction ER of the component 10.

The method comprises a number of steps, which are described below. Some or all of the steps described below may be performed sequentially and/or in the order described. Alternatively, some of the steps described below may be performed in parallel and/or in a different order than that described.

Said method comprises step S11:

Heating, preferably homogeneous heating, of the rotor 12.

In step S11, the rotor 12 is warmed or heated by means of energy input. Heating can be done by external heat treatment in a furnace. Heating can also be achieved by energizing the wire windings 26. The heating of the rotor 12 is preferably carried out in such a way that the rotor 12 is heated homogeneously or uniformly. However, uneven heating can also have advantages.

In a step S12, the method comprises:

Aligning the rotor 12 such that the extension direction ER is substantially vertical and the winding head 30 is arranged on the vertically upper end side 18.

In this context, the term 'essentially' includes an exact vertical orientation as well as orientations that are still tolerable for achieving one or more technical effects of the method.

In a step S13, the method comprises:

Applying a liquid and/or solidifiable impregnating material 52 which melts when heated to first component regions 53 on the vertically upper end side 18 to cover the winding heads 30 with the impregnating material 52 such that the impregnating material 52 flows due to gravity and/or capillary action from the winding heads 30 via the intermediate regions 32 in the direction of the vertically lower end side 18.

Figure 6:
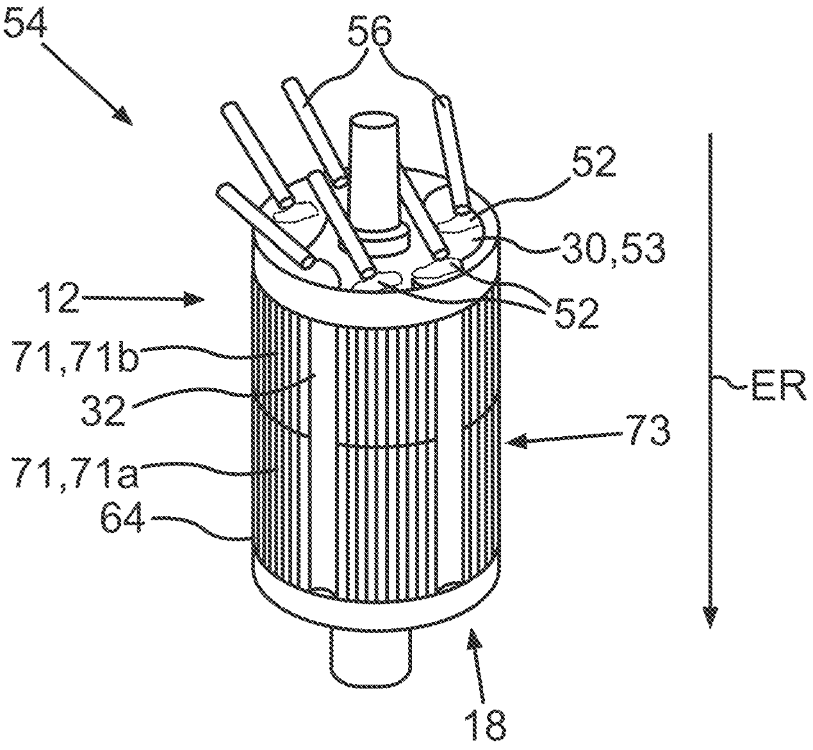
FIG. 6 shows an arrangement for applying an impregnating material.
Figure 7:
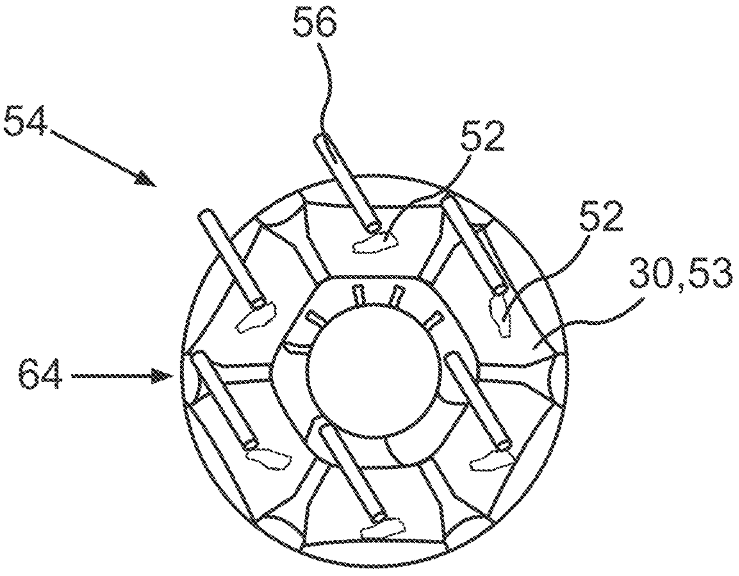
FIG. 7 shows the arrangement of FIG. 6 in a plan view.

FIG. 6 shows an arrangement 54 for applying the impregnating material 52 and FIG. 7 shows the arrangement 54 in a plan view. The impregnating material 52 can be applied, for example, by a plurality of metering nozzles 56. The number of metering nozzles 56 can correspond to the number of teeth 22 of the rotor 12. An outlet of each metering nozzle 56 is directed towards a first component region 53 on the vertically upper end side 18.

The first component regions 53 can be the winding heads 30 themselves. In general, the first component regions 53 on the vertically upper end side 18 are regions that are suitable for covering the winding heads 30 with the impregnating material 52. For example, the first component regions 53 on the vertically upper end side 18 can also be arranged on specially designed star washers 20, from which the winding heads 30 can be coated with impregnating material 52.

When the impregnating material 52 is applied to the first component regions 53, it is heated by the rotor 12. This allows the impregnating material 52 to melt. The impregnating material 52 is then present on the first component regions 53 in a more liquid state than when applied and can coat the winding heads 30 from there.

Alternatively or additionally, the impregnating material 52 can be applied to the first component regions 53 while still in a liquid state. For this purpose, the impregnating material 52 can, for example, be heated before application.

For example, a material whose viscosity decreases when heated can be used as the impregnating material 52. Preferably, an impregnating resin such as an epoxy resin and/or a polyester resin, in particular a 1K polyester resin or a 2K polyester resin, is used as the impregnating material 52.

Due to gravity and/or capillary force, the impregnating material 52 flows from the winding heads 30 over the intermediate regions 32 in the direction of the vertically lower end side 18 of the rotor 12 and thereby coats the wire windings 26.

Figure 8:
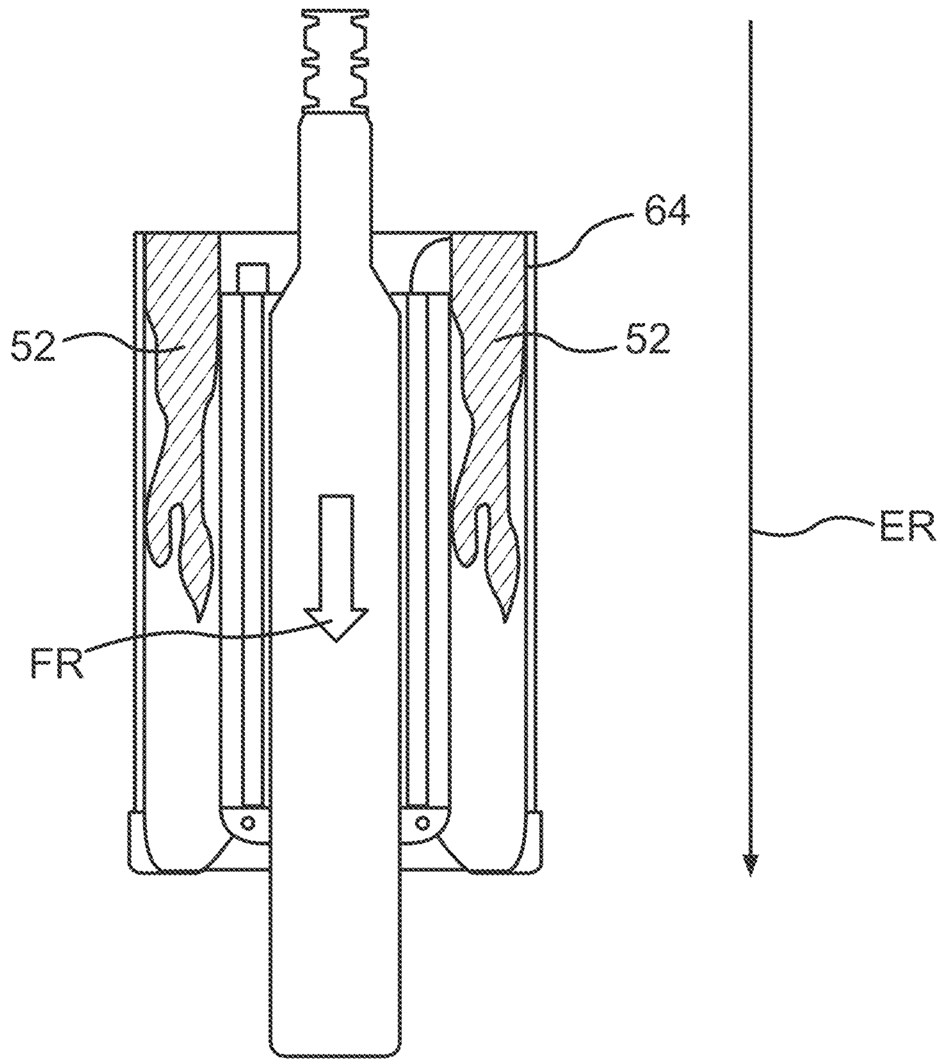
FIG. 8 shows a flow direction of the impregnating material.

FIG. 8 shows a flow direction FR of the impregnating material 52, which is arranged substantially parallel to the extension direction ER.

The vertical orientation of the rotor 12 is maintained for applying the impregnating material 52 and coating the wire windings 26.

To apply the impregnating material 52, the rotor 12 is preferably not moved perpendicular to the extension direction ER, preferably not rotated about the extension direction ER and/or preferably not moved or rotated in such a way that the flow of the impregnating material 52 due to gravity and/or capillary force from the winding heads 30 via the intermediate regions 32 in the direction of the vertically lower end side 18 is reduced, diverted and/or disturbed by centrifugal forces and/or acceleration forces.

Figure 9:
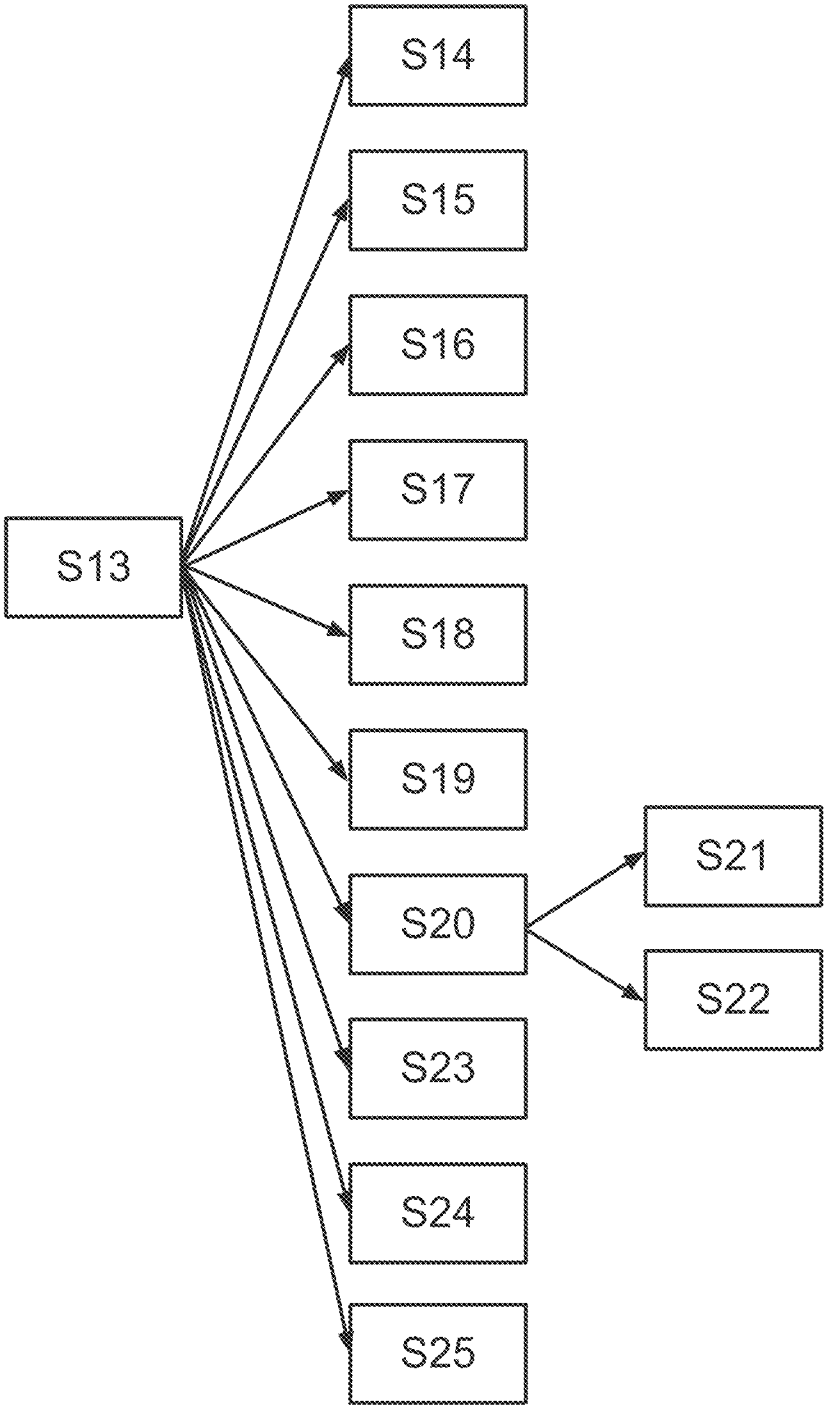
FIG. 9 shows further embodiments of a step of the method according to FIG. 5.
Figure 10:
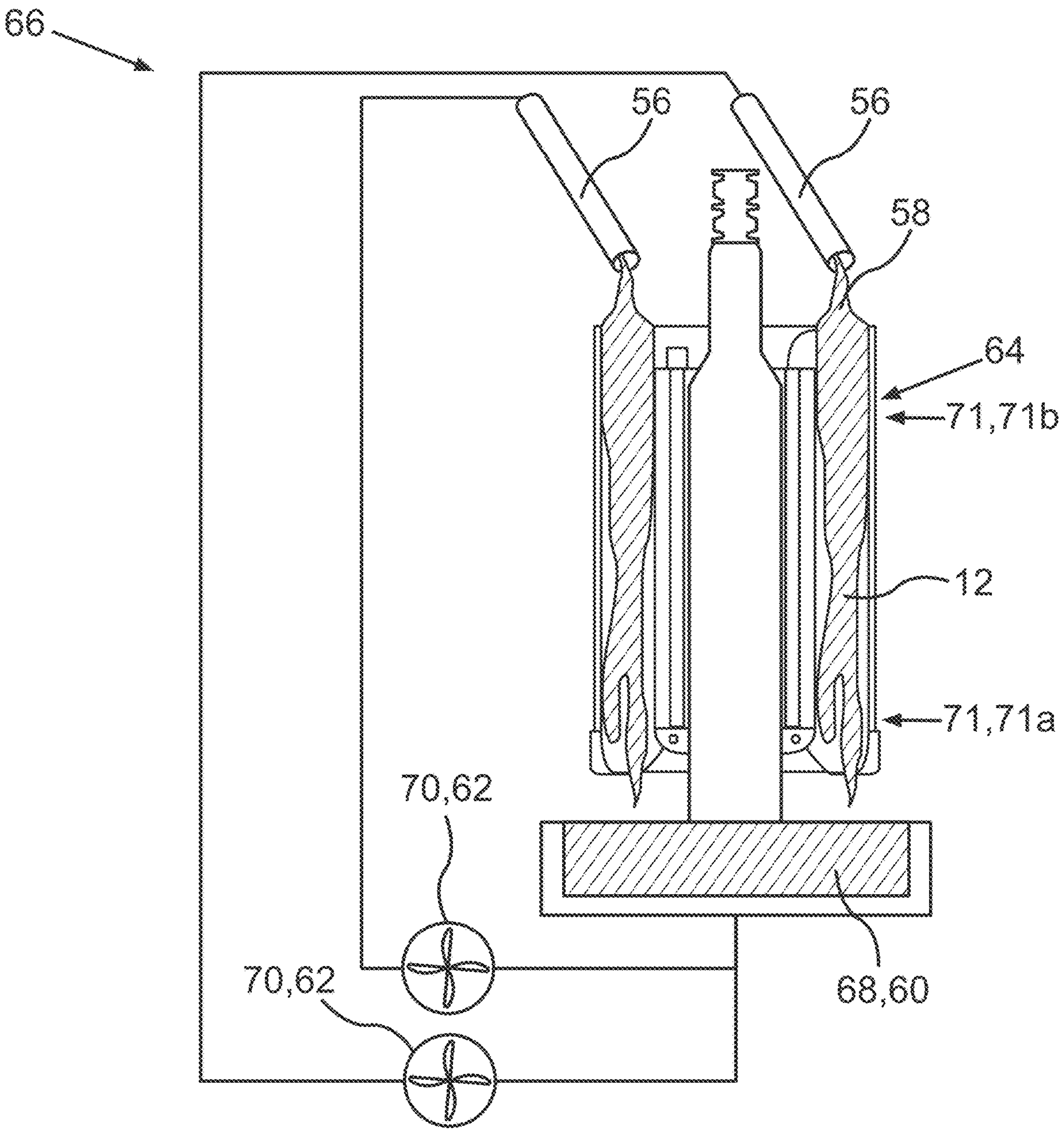
FIG. 10 shows an arrangement for returning the impregnating material.

FIG. 9 shows further embodiments of step S13 of the method. FIG. 10 is a related illustration:

In a step S14, the impregnating material 52 can be applied while energizing the wire windings 26. Due to the Joule effect, heat is generated in the wire windings 26 due to the power loss, which is distributed in the rotor 12 and can support the melting of the impregnating material 52.

Alternatively or additionally, in a step S15, the application of the impregnating material 52 can take place under vacuum. This prevents air inclusions in the wire windings 26.

Alternatively or additionally, in a step S16 for applying the impregnating material 52, an overpressure can be generated on the vertically upper end side 18 of the rotor 12 and/or a negative pressure can be generated on the vertically lower end side 18 of the rotor 12.

Furthermore, in a step S17, a previously metered application amount 58 of the impregnating material 52 can be applied to the first component regions 53. The sufficient application quantity 58 can, for example, be determined empirically.

Alternatively or additionally, in a step S18, the impregnating material 52 can be applied continuously and/or in an excess application amount 58 to the first component regions 53, so that impregnating material 52 drips off the vertically lower end side 18. A continuous flow of impregnating material 52 can be formed via the wire windings 26. As a result, air inclusions 74 in the wire windings 26 can be flushed out and/or displaced (displacement principle).

Alternatively or additionally, the application quantity 58 of the impregnating material 52 and/or a dripping quantity 60 of the impregnating material 52 can be detected in a step S19.

Alternatively or additionally, a degree of impregnation of the wire windings 26 can be determined in a step S20. In other words, in step S20 it can be checked whether the wire windings 26 are sufficiently coated with impregnating material 52, free of air inclusions and/or homogeneously coated.

In a step S21, the degree of impregnation can be determined and/or the checking can be carried out by detecting an electrical capacitance of each wire winding 26 and/or a temperature of the component 10. The capacity is proportional to the degree of impregnation depending on the temperature of the component 10.

In a step S22, the degree of impregnation can also be determined and/or checked by comparing the application quantity 58 and the dripping quantity 60. If, for example, the dripping quantity 60 substantially corresponds to the application quantity 58, this may indicate that the wire windings 26 are sufficiently and/or homogeneously coated with impregnating material 52 and the wire windings 26 can no longer absorb any further impregnating material 52.

In a step S23, the application quantity 58 can be regulated or metered based on the degree of impregnation.

Alternatively or additionally, in a step S24, a control system 62 can adjust the application quantity 58 such that it approximately corresponds to the dripping quantity 60. In this context, "approximately" is to be understood as meaning that the application quantity 58 is set relative to the dripping quantity 60 in such a way that, for example, overflow of the impregnating material 52 in the vertically upper end side 18 to outer regions 64 of the rotor 12 between the end sides 18 can be avoided.

The impregnating material 52 dripping off the vertically lower end side 18 can additionally be collected in a step S25 and returned for renewed application to the first component regions 53 of the same or to the next component 10.

FIG. 10 shows an example of an arrangement 66 for returning the impregnating material 52. The dripping impregnating material 52 is collected in a collecting basin 68 on the vertically lower end side 18 and conveyed by pumps 70 back to the metering nozzles 56 on the vertically upper end side 18.

Reference is again made to FIG. 5:

In a further step S26, the method comprises:

Solidification of the impregnating material 52.

The solidification of the impregnating material 52 is carried out by means of energy input by warming or heating.

Figure 11:
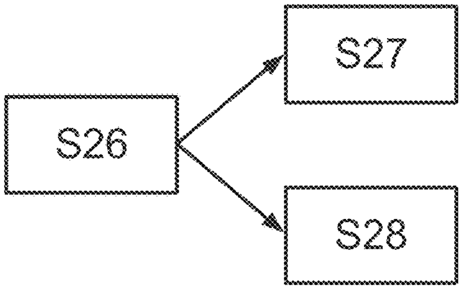
FIG. 11 shows embodiments of a step of the method for impregnating the wire windings.

FIG. 11 shows embodiments of step S26. Step S26 comprises steps S27 and S28. However, step S26 may also comprise only one of the two steps S27 and S28.

Step S27 comprises:

Gelling of the impregnating material 52 on the wire windings 26.

For this purpose, the impregnating material 52 is designed to be gelable. Impregnating resin, for example, is suitable as a gelable impregnating material 52.

The gelling of the impregnating material 52 preferably takes place by energizing the wire windings 26. Due to the Joule effect, heat is generated due to the power loss in the wire windings 26, which heat enables or supports the gelling of the impregnating material 52.

Alternatively or in addition to energizing the wire windings 26 and thus internally heating them, the rotor 12 can be heat treated from outside. The rotor 12 can be heat treated by means of convection air, infrared radiation and/or induction. Furthermore, the gelling of the impregnating material 52 can also take place under vacuum.

During the gelling of the impregnating material 52 in the wire windings 26 in a lower region, further impregnating material 52 can be continuously applied to the respective winding head 30. Thus, the wire windings 26 can be successively filled with impregnating material 52 and thus impregnated. This means that the wire winding is flooded without the need for initial complex sealing on the underside of the component.

Gelling can also initially be initiated only in one winding region 71 of the wire windings 26. The gelling of the impregnating material 52 therefore does not have to be initiated simultaneously on the entire wire winding 26, but can be initiated locally and limited to the winding region 71.

For example, a first winding region 71*a* may be located in a lower region of the component 10. In this way, the impregnating material 52 can first be gelled in the first winding region 71*a* and then the wire winding 26 can be further coated and/or filled with impregnating material 52 in the direction of the vertically upper end side 18.

Gelling can then be initiated in a second winding region 71*b*, which is arranged, for example, vertically above the first winding region 71*a*.

Step S28 comprises:

Curing the impregnating material 52 on the at least one wire winding.

The curing of the impregnating material 52 preferably takes place after the gelling of the impregnating material 52 and with heat treatment of the component 10. The gelling of the impregnating material 52 can take place immediately before the curing of the impregnating material 52 or can transition seamlessly into the curing of the impregnating material 52.

Curing can take place by external heat treatment in a furnace. The heating of the rotor 12 is preferably carried out in such a way that the rotor 12 is heated homogeneously and uniformly. By first gelling in the system for filling the impregnating material, the component can then be transported to another local region, e.g. to the oven in question, where curing can then take place. This means that the system for filling the impregnating material can be freed up early (i.e. before the curing process) for the next component, which avoids downtime.

The method further comprises the step (not shown):

Avoiding application of the impregnating material 52 to second component regions 73 which are not to be coated with impregnating material 52.

Second component regions 73 are regions of the component 10 that are not to be coated with impregnating material 52. One step is therefore to avoid applying the impregnating material 52. To avoid this, the metering nozzles 56 of the arrangement 54 shown in FIG. 6 and FIG. 7 can be suitably designed and specifically controllable.

Before applying the impregnating material, the method may further comprise the step (not shown):

Sealing and/or covering second component regions 73.

In order to further reduce contamination of the second component regions 73, the second component regions 73 can be additionally sealed and/or covered before application. For example, in the rotor 12, the cooling channels 48 should remain free of impregnating material 52 so that the cooling of the rotor 12 by the cooling channels 48 is not impaired. If the cooling channels 48 exit at the end sides 18 of the laminated core 16, these second component regions 73 can be sealed and/or covered. The sealing and/or covering can be achieved by the star washer 20 on the front side 18 of the laminated core 16, by additional star washers 20, displacers or other suitable means. Preferably, the vertically upper end side 18 is sealed and/or covered such that the impregnating material 52 can flow from the winding heads 30 exclusively via the intermediate regions 32 in the direction of the vertically lower end side 18.

Alternatively or additionally, a reservoir 72 for flooding the winding heads 30 with impregnating material 52 can be formed on the vertically upper end side 18.

Figure 12:
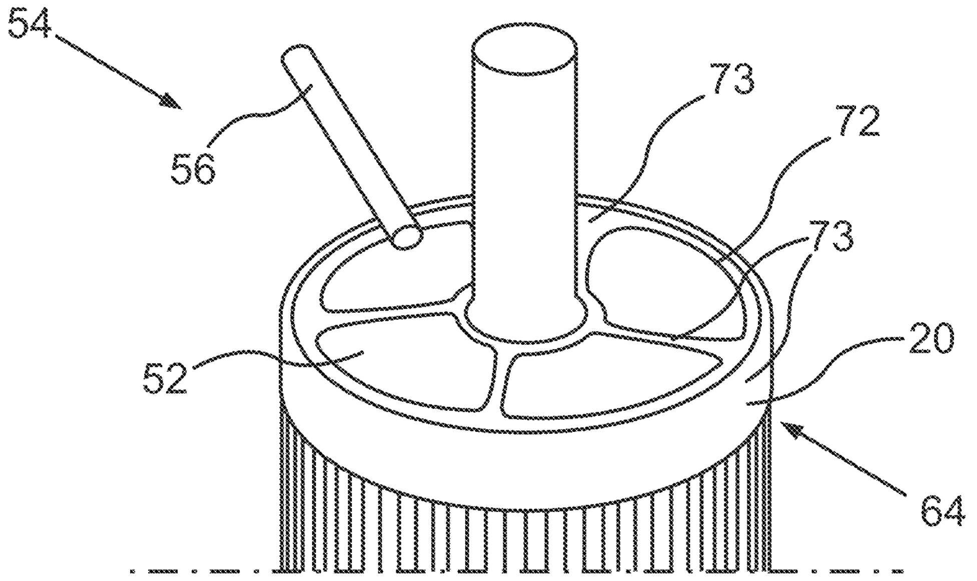
FIG. 12 shows another arrangement for applying the impregnating material.

FIG. 12 shows a further arrangement 54 for applying the impregnating material 52. To form the reservoir 72, for example, the star washers 20 on the end sides 18 of the laminated core 16 can be suitably designed. In this case, a single metering nozzle 56 may be sufficient to flood the winding heads 30. The reservoir 72 is then filled with impregnating material 52 through the metering nozzle 56.

In the method, it may thus be sufficient to seal and/or cover the second component regions 73 on the vertically upper end side 18. Other regions, for example the outer regions 64 of the rotor 12 between the end sides 18, do not need to be sealed and/or covered.

Figure 13:
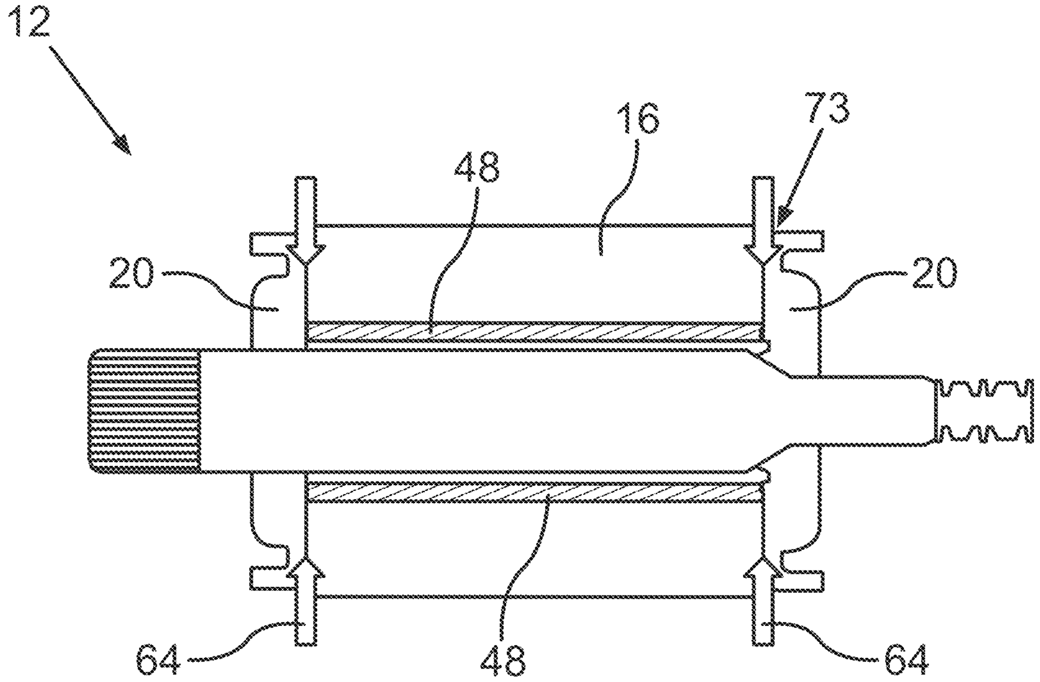
FIG. 13 shows a section of the rotor in a further side view, wherein the wire windings are impregnated according to a known method.

FIG. 13 shows a section of the rotor 12 in a further side view, wherein the wire windings 26 are impregnated according to a known method. In known methods for impregnating the wire windings 26, impregnating material 52 can penetrate from the outer regions 64 of the rotor 12 between the star washer 20 and the laminated core 16 into the cooling channels 48.

Figure 14:
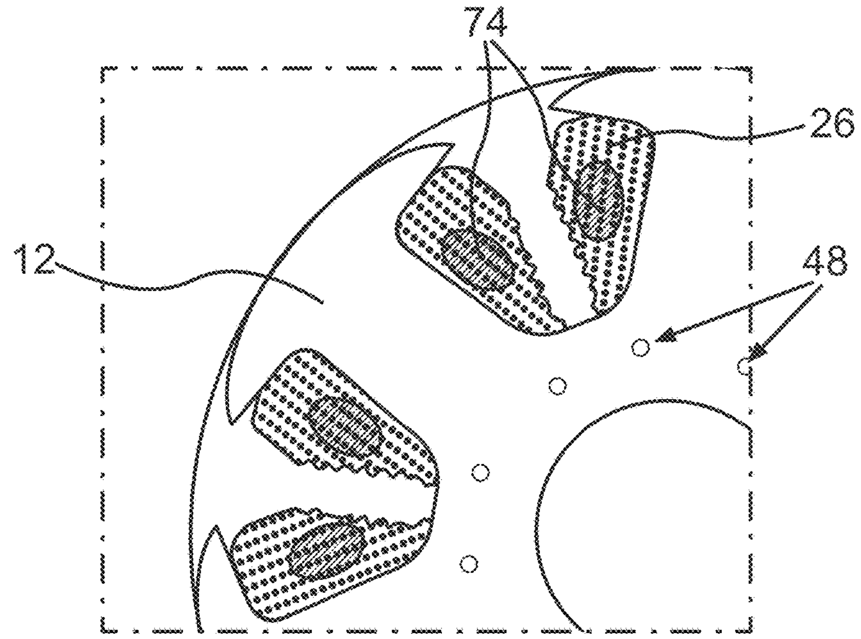
FIG. 14 shows a section of the rotor of FIG. 13 in a plan view, the section being illuminated with UV light.

FIG. 14 shows a section of the rotor 12 of FIG. 13 in a plan view, the section being illuminated with UV light; Under UV light, white regions indicate impregnating material 52, while dark regions indicate a cavity or the wire windings 26. The image shows air inclusions 74 in the wire windings 26 and an inhomogeneous and/or inadequate distribution of the impregnating material 52. In addition, the image shows that several cooling channels 48 are filled with impregnating material 52.

Figure 15:
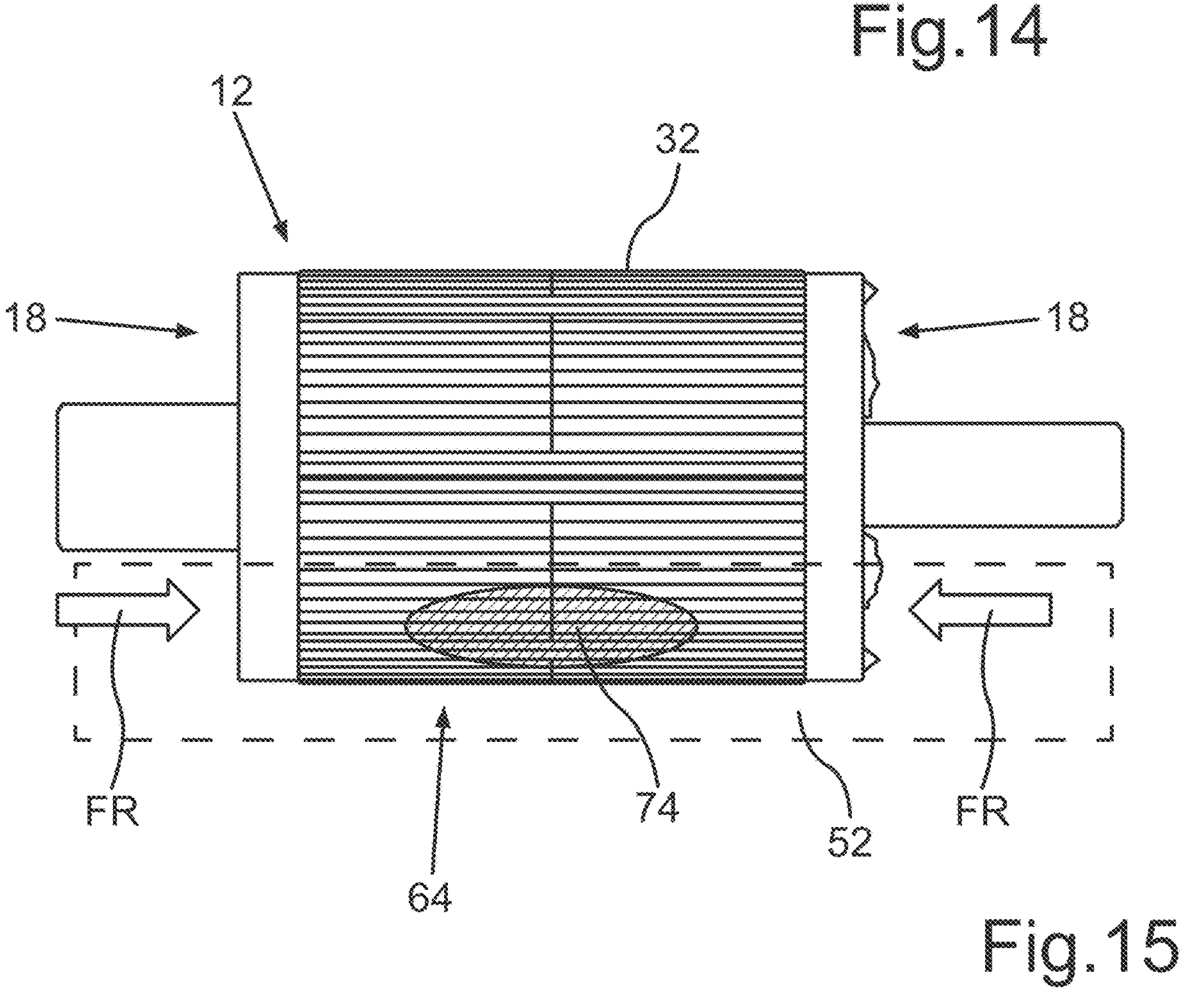
FIG. 15 shows air inclusions resulting from known methods.

FIG. 15 shows the air inclusions 74 that arise in known methods. As can be seen from FIG. 15, such air inclusions 74 are located in known methods in particular in the intermediate region 32 between the end sides 18. The air inclusions 74 arise, among other things, because in known methods the impregnating material 52 is applied simultaneously from several sides of the component 10, here from the end sides 18 and the outer regions 64 of the rotor 12. The impregnating material 52 thus coats the wire windings 26 along several flow directions FR. The air can therefore no longer escape and the air inclusions 74 are formed. Furthermore, the air inclusions 74 cannot be flushed out using known methods.

Figure 16:
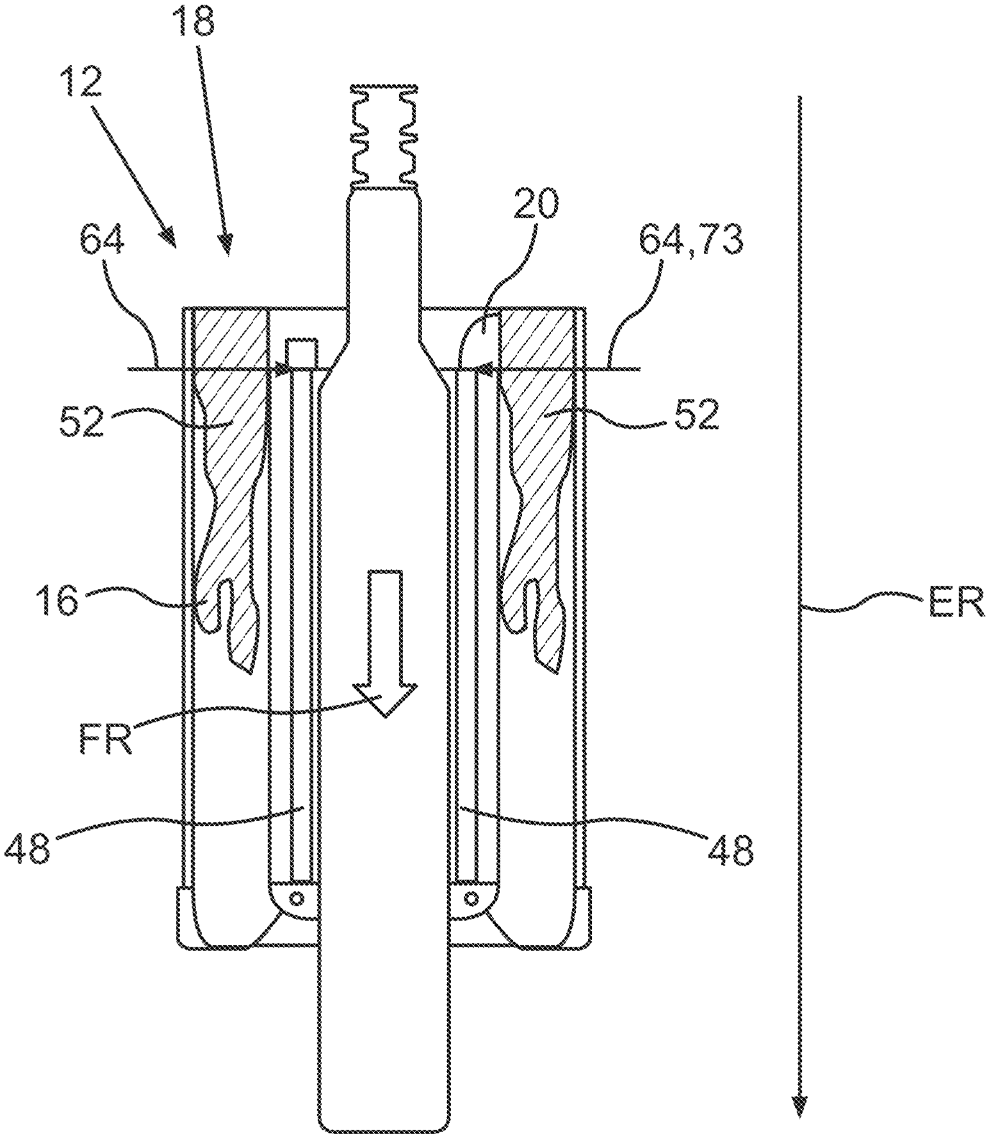
FIG. 16 shows a section of the rotor in a further side view, wherein the wire windings are impregnated according to the method.

FIG. 16 shows a section of the rotor 12 in a further side view, wherein the wire windings 26 are impregnated with the described method.

The method described prevents the penetration of the impregnating material 52 from the outer regions 64 of the rotor 12 between the star washer 20 on the vertically upper end side 18 and the laminated core 16 into the cooling channels 48. No impregnating material 52 can penetrate into the cooling channels 48 from the outer regions 64 because the flow direction FR of the impregnating material 52 runs essentially parallel to the extension direction ER of the rotor 12.

Furthermore, the described method enables the wire windings 26 to be filled with impregnating material 52 without air inclusions and/or homogeneously. The single flow direction FR allows air to escape to the vertically lower end side 18, which can reduce the risk of air inclusions 74. Any air inclusions 74 that have formed can be flushed out, which further reduces the occurrence of air inclusions 74. Thus, the resin filling level in the method described here is significantly increased compared to known processes.

Figure 17:
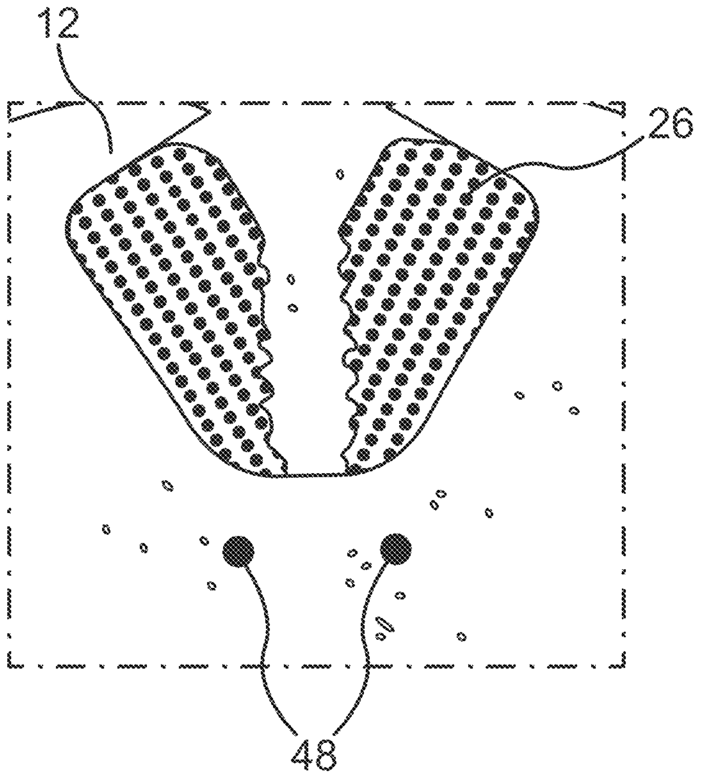
FIG. 17 shows a section of the rotor of FIG. 16 in a plan view, the section being illuminated with UV light.

FIG. 17 shows a section of the rotor 12 of FIG. 16 in a plan view, the section being illuminated with UV light. The image shows no air inclusions 74 in the wire windings 26 and a homogeneous and/or sufficient distribution of the impregnating material 52. In addition, the cooling channels 48 have remained free of impregnating material 52.

The invention therefore also provides the component 10 with wire windings 26, the impregnation of which can be achieved by the method described. In particular, the component 10 can be designed as a rotor 12 or stator 50 for an electric motor. The invention therefore also provides the electric motor which has the component 10.

A principle of preferred embodiments of the invention can thus be summarized as follows:

One idea of preferred embodiments of the invention is a process or method that enables good penetration of the wire windings, but does not entail the disadvantages of previously known methods. The process consists of a sequence of several steps, with the special features being found in step 2 "impregnation of a vertically standing component" and step 3 "gelling and fixing of the resin to the component":

- Step 1: Homogeneous defined preheating of the component
- Step 2: Impregnation of a vertical, non-moving component
  - Targeted metering of material onto the winding heads on the upper side of the component; if necessary, flooding of the winding heads (trough made of star washers, displacers, etc.); if necessary, targeted material flow through windings
  - Energizing of the component to compensate for heat losses (optional); Constant component temperature throughout the entire process
  - Evolution: vertical penetration of the winding by capillary actions and gravity
- Step 3: Gelling and fixing of the resin to the component by energizing the windings (electricity-heat process); gelling can also be carried out using other heat input processes (induction, infrared, etc.); optionally, improved filling of the windings can be achieved by further filling the component with resin (procedure from step 2).
- Optionally, impregnation and gelling can be carried out under vacuum to increase the winding filling with resin. This means degassing/venting the winding in an encapsulated environment before and during the process.

Below is a detailed description of the process steps:

Step 1:

The component is heated by introducing energy through a furnace or another method. The exact heating method can be freely selected. A homogeneous heat distribution in the component is preferred.

Step 2:

There are several approaches for impregnating the vertically standing, non-moving component. What they all have in common is that resin is applied to the upper side and "runs" downwards in the winding. The hot copper winding initially causes the resin to become thin, so that the windings in the grooves of the component are completely soaked if the resin viscosity is sufficiently low. The "flow" of the thin resin downwards simultaneously represents the impregnation/penetration of the windings with resin. FIG. 8 shows the resin flow as an example.

The application of resin to the windings is implemented using a metering system and precise feeding (e.g. through nozzles). FIG. 6 and FIG. 7 show the application of resin with six exemplary metering nozzles (one per pole).

As an alternative procedure for exact metering, FIG. 12 shows as an example the flooding of the winding head with a metering nozzle. The prerequisite here is that the product enables a resin reservoir on the upper side. The product must be designed and sealed accordingly to prevent resin from penetrating the cooling system and the external surface. The resin accumulates in the region of the winding heads and can only "flow away" downwards through the windings.

A special feature is the control of the metering to the winding heads in correlation to the product. An algorithm uses sensors to control the resin application by detecting the resin that is added and that is dripping out. The detection can be done using optical sensors or other physical quantities such as the weight of the product or the excess resin.

As an alternative to direct control via measured variables, the process can also be enabled by empirically determining the resin application and the amount of resin absorbed in tests.

One possibility is to flush out or force out air inclusions through the volume flow of the resin in the windings. This requires resin circulation in the system in order to return the collected resin to the metering system and use it for re-impregnation of the winding (see FIG. 10). Fresh resin is added continuously.

During the impregnation process, the component is connected to a power supply unit of the impregnation system so that the winding and the component can be heated or kept at a constant temperature by supplying heat using the Joule effect (i.e. the winding power loss deliberately caused here).

Step 3:

The resin is gelled using the current heat process (Joule effect—i.e. the winding power loss deliberately caused here), through which the winding of the component is further heated. Alternatively or additionally, gelling may be carried out using one of the heat treatment methods described above. From the resin-specific gelling temperature, the viscosity of the resin increases so that the resin adheres to the winding and can no longer flow out of it.

The gelling time window can be several minutes. The viscosity does not change suddenly, but in a continuous process. During this process, as described in step 2, resin is further applied to the windings to fill them as much as possible.

The component is then further gelled and cured.

Step 4:

The component is cured in an oven. The exact heating method can be freely selected. It is important to ensure external heat input into the component and to maintain the component temperature according to the resin specification.

Preferred embodiments of the invention have the following technical advantages:

- No contamination of the outer surface of the laminated core;
- Venting of the winding, since the resin introduction occurs from only one direction;
- No contamination of the cooling system, consequently no resin is carried radially towards the shaft due to the static vertical position of the rotor; and
- Simplified impregnation process compared to comparable methods, consequently reducing process costs.

The resin layer may be a maximum of 0.1 mm thick at critical points in order to avoid collisions with the stator, taking all tolerances into account. Since the rotor does not have to be placed in a resin bath, no resin layer forms on the surface of the laminated core. This means that no subsequent surface cleaning or measurement of the resin application is necessary.

Adequate ventilation of the winding can also be achieved by this method. The resin is introduced at the upper side and then migrates downwards (see FIG. 8). On the underside, the winding is not yet sealed with resin, so that the air can escape. In contrast to dip rolling, no very large air bubble is formed. The degree of resin filling can be significantly increased.

The cooling channels run vertically in the space during the impregnation process (see FIG. 16). In contrast to dip rolling, there is thus no gravitational-driven resin movement between the star washers and the laminated core (region of the upper two arrows in FIG. 16). In addition, no resin is applied in these regions from the outside. While these regions are flooded in a resin bath, they remain almost completely resin-free for the method shown here. This means that the cooling channels do not fill up or become clogged with resin.

Overall, the examples show how static impregnation of wire windings can be provided.

LIST OF REFERENCE NUMERALS

10 component
12 rotor
16 laminated core
18 end side
20 star washer
22 tooth
24 groove
26 wire winding
28 wire
30 winding head
32 Intermediate region
34 rotor ring
36 T-web
38 T-legs
40 coil
42 magnetic pole
44 pole piece
46 yoke
48 cooling channel
50 stator
52 impregnating material
53 first component region
54 arrangement for applying impregnating material
56 metering nozzle
58 applied quantity
60 dripping quantity
62 control system
64 external region
66 arrangement for returning the impregnating material
68 collecting basin
70 pump
71 winding region
71*a* first winding region
71*b* second winding region
72 reservoir
73 second component region
74 air inclusion
ER extension direction
FR flow direction

The invention claimed is:

1. A method for impregnating at least one wire winding of a component, wherein the at least one wire winding has a winding head on at least one end side of opposing end sides of the component and has an intermediate region extending between the end sides along an extension direction of the component, the method comprising the steps:

a) heating the component;

b) aligning the component such that the extension direction is substantially vertical and the winding head is arranged on the vertically upper end side;

c) applying a solidifiable impregnating material that is in a liquid state or melts upon application of heat, to at least one first component region of the component on the vertically upper end side to introduce the impregnating material into at least one region of the winding head in such a way that the impregnating material flows due to gravity and/or capillary action from the winding head via the intermediate region in the direction of the vertically lower end side; and d) solidifying the impregnating material, wherein step c) comprises:

c5) detecting an application quantity of the impregnating material which is applied to the at least one first component region and detecting a dripping quantity of the impregnating material which drips off the vertically lower end side of the component;

c6) determining a degree of impregnation of the at least one wire winding by comparing the detected application quantity with the detected dripping quantity; and c7) at least one of regulating or metering the application quantity of the impregnating material based on the determined degree of impregnation.

2. The method according to claim 1, wherein step d) comprises at least one of the following steps:

d1) gelling the impregnating material in the at least one wire winding;

d2) gelling the impregnating material by heat treatment of the component;

d3) gelling the impregnating material to prevent the flow of the impregnating material;

d4) gelling the impregnating material initially only in a lower winding region of the at least one wire winding and creating a backflow of the impregnating material in a winding region arranged above it; or d5) successive gelling of the impregnating material in a plurality of winding regions.

3. The method according to claim 2, wherein at least one of the following steps is carried out before applying the impregnating material in step c):

f1) sealing or covering at least one second component region of the component which is not to be coated with impregnating material;

f2) sealing or covering a second component region on the vertically upper end side such that when impregnating material is applied to the at least one first component region, the impregnating material flows exclusively from the winding head through the intermediate region of the at least one wire winding toward the vertically lower end side; or f3) forming a reservoir on the vertically upper end side for flooding the winding head with impregnating material.

4. The method according to claim 2, wherein at least one step of the method is carried out while the at least one wire winding is energized, under vacuum, or both.

5. The method according to claim 2, wherein step c) comprises at least one of the following steps:

c1) applying the impregnating material, the viscosity of which is reduced by heating the impregnating material; or applying the impregnating material, wherein the impregnating material is an c2) impregnating resin.

6. The method according to claim 2, wherein an overpressure is generated on the vertically upper end side compared to the vertically lower end side of the component and/or a negative pressure is generated on the vertically lower end side compared to the vertically upper end side of the component, for applying the impregnating material.

7. The method according to claim 2, wherein step d) further comprises that least one of the following steps:

d6) curing the impregnating material in the at least one wire winding; or d7) curing the impregnating material by heat treatment of the component.

8. The method according to claim 7, wherein at least one step of the method is carried out while the at least one wire winding is energized, under vacuum, or both.

9. The method according to claim 7, wherein step c) comprises at least one of the following steps:

c1) applying the impregnating material, the viscosity of which is reduced by heating the impregnating material; or c2) applying the impregnating material, wherein the impregnating material is an impregnating resin.

10. The method according to claim 7, wherein an overpressure is generated on the vertically upper end side compared to the vertically lower end side of the component and/or a negative pressure is generated on the vertically lower end side compared to the vertically upper end side of the component, for applying the impregnating material.

11. The method according to claim 1, wherein at least one step of the method is carried out while the at least one wire winding is energized, under vacuum, or both.

12. The method according to claim 11, wherein step c) comprises at least one of the following steps:

c1) applying the impregnating material, the viscosity of which is reduced by heating the impregnating material; or c2) applying the impregnating material, wherein the impregnating material is an impregnating resin.

13. The method according to claim 11, wherein an overpressure is generated on the vertically upper end side compared to the vertically lower end side of the component and/or a negative pressure is generated on the vertically lower end side compared to the vertically upper end side of the component, for applying the impregnating material.

14. The method according to claim 1, wherein step c) comprises at least one of the following steps:

c1) applying the impregnating material, the viscosity of which is reduced by heating the impregnating material; or c2) applying the impregnating material, wherein the impregnating material is an impregnating resin.

15. The method according to claim 14, wherein step c) further comprises at least one of the following steps:

c3) applying a metered application quantity of the impregnating material; or c4) flushing out air inclusions in the at least one wire winding by excess application of the impregnating material, continuous application of the impregnating material, or both.

16. The method according to claim 15, wherein step c) further comprises:

c8) determining the degree of impregnation by detecting an electrical capacitance of the at least one wire winding.

17. The method according to claim 14, wherein an overpressure is generated on the vertically upper end side compared to the vertically lower end side of the component and/or a negative pressure is generated on the vertically lower end side compared to the vertically upper end side of the component, for applying the impregnating material.

18. The method according to claim 1, wherein an overpressure is generated on the vertically upper end side compared to the vertically lower end side of the component and/or a negative pressure is generated on the vertically lower end side compared to the vertically upper end side of the component, for applying the impregnating material.

19. The method according to claim 1, wherein at least one of the following steps is carried out before applying the impregnating material in step c):

f1) sealing or covering at least one second component region of the component which is not to be coated with impregnating material;

f2) sealing or covering a second component region on the vertically upper end side such that when impregnating material is applied to the at least one first component region, the impregnating material flows exclusively from the winding head through the intermediate region of the at least one wire winding toward the vertically lower end side; or f3) forming a reservoir on the vertically upper end side for flooding the winding head with impregnating material.

20. The method according to claim 1, further comprising the following steps:

g1) collecting impregnating material dripping from the vertically lower end side; and g2) returning the collected impregnating material for reapplication to the winding head.

* * * * *